Jan. 31, 1928.
W. HOFFA
1,658,018
AUTOMATIC FEEDER FOR FOWLS
Filed Jan. 5, 1927
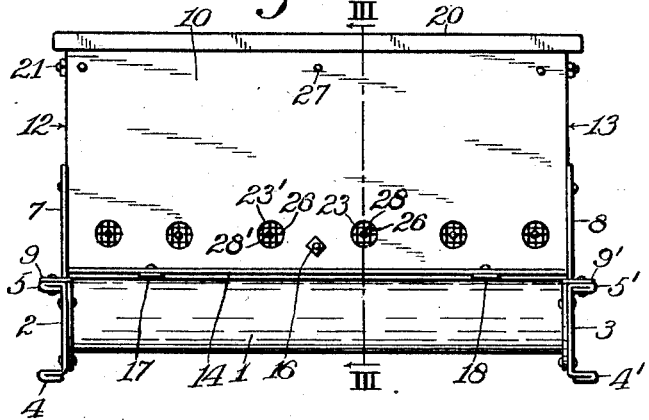
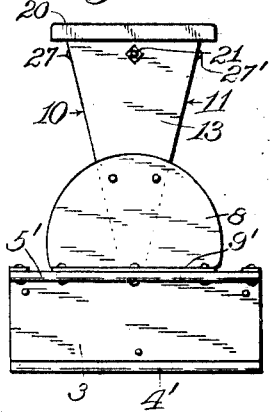
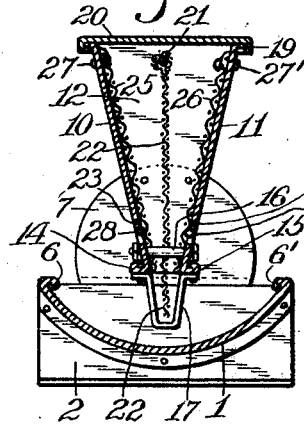
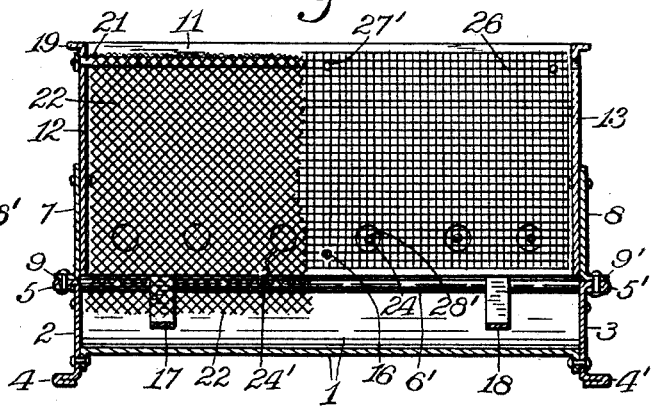
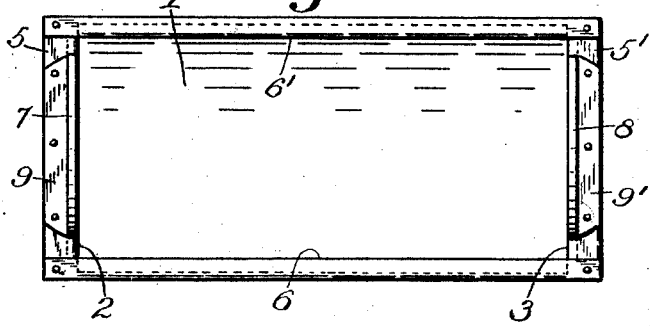
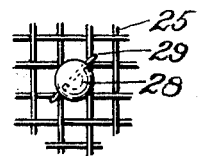
INVENTOR:
William Hoffa,
BY
E. T. Silvius,
ATTORNEY.

Patented Jan. 31, 1928.

1,658,013

UNITED STATES PATENT OFFICE.

WILLIAM HOFFA, OF CRAWFORDSVILLE, INDIANA, ASSIGNOR TO WILLIAM W. CLARKE, OF NELSON, CALIFORNIA.

AUTOMATIC FEEDER FOR FOWLS.

Application filed January 5, 1927. Serial No. 159,181.

This invention relates to means whereby domestic fowls may obtain clean and healthful food at will, the invention having reference more particularly to mechanical means whereby food may be automatically supplied in small quantities to a feed-trough or suitable receptacle from which the fowls may obtain the food.

An object of the invention is to provide an improved automatic feeder which shall be so constructed as to be adapted to supply food for fowls as may be desired and maintain a constant supply of food, especially dry grain food for chickens.

Another object is to provide an improved and economical feeder for fowls that shall be so constructed as to preserve food in a cleanly condition and ready at all times to be eaten.

A further object is to provide an automatic feeder which shall not be costly to manufacture, and which shall have reliable means for feeding by gravity as the visible supply of food is taken by fowls without wastefulness.

A still further object is to provide feeding means in automatic feeders which shall be so constructed as to be incidentally actuated by fowls securing food in the feeder, and prevent the food from becoming packed in the feed-hopper of the apparatus with consequent interruption of supply of food.

With the above-mentioned and other objects in view, the invention consists in an automatic feeder of novel construction generally and particularly with reference to means for assuring adequate feeding of fowls, the invention consisting also further in the parts and combinations and arrangements of parts as hereinafter particularly described and further defined in the accompanying claims.

Referring to the drawings,—Figure 1 is a side elevation of the improved feeder; Fig. 2 is an end elevation of the feeder; Fig. 3 is a section on the line III—III on Fig. 1; Fig. 4 is a vertical longitudinal central section; Fig. 5 is a top plan of the feed-trough comprised in the apparatus; and Fig. 6 is a fragmentary elevation of an improved agitator, on an enlarged scale.

Similar reference characters in the various figures of the drawings indicate corresponding elements of features of construction herein referred to in detail.

In a practical embodiment of the invention a suitable receptacle for food is provided, from which a fowl may eat, the receptacle preferably having a trough-shaped body portion 1 and vertical end members 2 and 3 secured to the body portion, the end members being adapted to constitute supports and preferably having laminated base flanges 4 and 4' respectively on their lower portions, the upper portions of the end members having outward extending laminated top flanges 5 and 5' respectively. The feed-trough is curved so as to have a concave upper face and the upper edges of the body portion have flanges 6 and 6' thereon that extend inwardly or each towards the other, to prevent food from being dragged out over the top edges of the feed-trough. A pair of frame plates 7 and 8 are provided that are arranged upon the end members of the feed-trough and have flanges 9 and 9' that are secured to the flanges 5 and 5' respectively.

A novel feed-hopper is provided which comprises two side plates 10 and 11 and end plates 12 and 13, suitably connected together. The upper portions of the side plates are spaced apart considerably more than the lower portions of the plates, so as to retard flow of grain food from between the lower portions of the plates, usually the lower portions of the side plates having outward extending flanges 14 and 15 respectively. Preferably a spacing stud 16 is arranged between the lower portions of the side plates and secured thereto, the side parts preferably being further tied together by means of guiding and guarding yokes 17 and 18 secured to the flanges 14 and 15. The end plates 12 and 13 are arranged on the inner sides of the frame plates 7 and 8 and secured thereto, whereby the feed-hopper is mounted on the feed-trough. The upper portion of the feed-hopper preferably has an outward extending flange 19 thereon which removably supports a suitable lid 20.

A rod 21 is secured to the upper portions of the end plates 12 and 13 so as to be on the median plane of the feed-hopper and supports the upper portion of an agitator 22 preferably composed of woven wire or screening material, the agitator extending centrally down into the guard yokes 17 and 18, or beyond the lower portion of the feed-hopper and into the upper portion of the feed-trough so as to be accessible to feeding fowls, permitting the fowls to peck at the agitator in their search for food as the supply in the feed-trough becomes exhausted, vibration of the agitator causing food to be loosened, so as to gravitate into the feed-trough.

A pair of other agitators preferably are provided, to insure efficient feeding of food into the feed-trough, the side plates 10 and 11 of the feed-hopper having a suitable number of apertures 23 and 23′ therein and 24 and 24′ respectively at a short distance from the lower edges of the plates. Two additional agitators 25 and 26 are composed also of wire and arranged against the sides of the plates 10 and 11 respectively, and the upper portions thereof are secured to the plates by means of devices 27 and 27′, such as rivets or bolts, the remaining portions being free to be moved inwardly but normally gravitating to the inclined side plates 10 and 11 and so as to extend across the apertures in the sides plates. In each aperture an attraction such as a bright button or an imitation pearl bead 28 and 28′ is arranged and secured to the outer side of the agitator, as by means of a wire thread 29.

In practical use the feed-hopper is supplied with food from time to time as may be required, the quantities provided being proportioned to the number of fowls requiring the food. The food, whether corn or other grains, gravitates into the feed-trough and usually supplies the feed-trough as rapidly as the food is eaten. Occasionally the food may become packed and not drop out of the feed-hopper as the supply in the feed-trough becomes exhausted. The fowls in their efforts to gather the last few grains of food in the feed-trough incidentally strike the lower portion of the agitator 22 and cause it to vibrate with the result that food becomes loosened and falls into the feed-trough. The fowls are attracted by the bright objects 28 and peck at them, causing vibrations of the agitators 25 and 26 with the result that they loosen food which falls into the feed-trough. Thus, feeding is always assured while any food remains in the feed-hopper.

What is claimed is:

1. An automatic gravity feeder for fowls provided with a reticulate vibratory agitator suspended at its top in the feeder hopper, and a plurality of bright objects secured to the lower portion of the agitator.

2. An automatic feeder including a feed-hopper provided with a movable reticulate agitator to loosen packed food, the agitator having bright objects thereon to attract fowls thereto, and a food-receptacle under the feed-hopper.

3. An automatic gravity feeder including a trough, and a feed-hopper mounted on the trough and provided therein with a loosely suspended vibratory agitator having objects thereon to induce fowls to peck and vibrate the agitator.

4. An automatic gravity feeder comprising a feed-trough, a feed-hopper connected to the opposite ends of the feed-trough and having apertures in the lower portions of the opposite sides thereof, and two reticulate vibratory agitators secured at their tops to the upper portions of said sides respectively, each agitator extending downward past said apertures and having a plurality of attractive devices secured thereto opposite to the apertures respectively.

5. In a gravity feeder, the combination with a feed-trough having vertical frame plates on the opposite ends thereof, of a feed-hopper having side plates provided each with a plurality of apertures in the lower portions thereof and having also end plates that are secured to said frame plates, and a reticulate vibratory wire agitator supported at its top in the upper portion of the feed-hopper and extending downward past said apertures and accessible to fowls at the feed-trough.

6. In a gravity feeder, the combination of a feed-trough, a feed-hopper mounted upon the feed-trough and having inclined sides spaced apart at their lower ends, a reticulate vibratory agitator arranged between said sides and bodily supported adjacent to its top, the agitator extending downward beyond said sides, and guiding guards for the lower portion of the agitator supported substantially by said inclined sides.

In testimony whereof, I affix my signature on the 29th day of December, 1926.

WILLIAM HOFFA.